ELECTRIC CIRCUITS WITH GROUPS OF RELAYS ACTUATED BY CURRENT IMPULSES

Filed Sept. 29, 1961

2 Sheets-Sheet 1

INVENTORS
ERWIN SCHLATTER
WALTER HOPPE
By [signature] Atty

INVENTORS
ERWIN SCHLATTER
WALTER HOPPE
By [signature] Atty

United States Patent Office 3,170,096

Patented Feb. 16, 1965

3,170,096

ELECTRIC CIRCUITS WITH GROUPS OF RELAYS ACTUATED BY CURRENT IMPULSES

Erwin Schlatter, Oberglatt, Zurich, Switzerland, and Walter Hoppe, Munich, Germany, assignors to El-Re-Ma S.A. per lo sfruttamento di brevetti, Lugano, Switzerland Filed Sept. 29, 1961, Ser. No. 141,723
5 Claims. (Cl. 317—157)

Electric circuits with at least two groups of relays actuated by current impulses and with an impulse generator for feeding the relay groups with control impulses, are already known, while each relay group is provided with a maintaining circuit for maintaining a relay armature actuated in consequence of a control impulse and the contacts of a relay group are switched in series with the windings of another relay group. In known circuits of this type an electro-mechanical or electronic impulse generator provides determined control and holding impulse series. Each control impulse is followed by a holding impulse and vice versa, whereby this alter-sequence effects the switching of the relays in a definite manner. These circuits have the disadvantage that an accidental omission of a control impulse may lead to a loss of switching positions in the relay groups, so that in the case of circuits of relay calculating machines or automatic controls, not only the defective switch operations, but also all the preceding operations, must be repeated.

The present invention has for its object to remedy this disadvantage. It relates to an electric circuit in which each holding circuit is fed with direct current and is controlled by an electronic switch element and this switch element responds in such a manner on the presence of a current produced by a control impulse passing through at least one relay winding of a group and a contact of another group, that the holding current is interrupted during the duration of each control impulse.

The accompanying drawing shows diagrammatically several embodiments of this invention.

FIG. 1 shows the basic circuit of a relay arrangement with synchronised relay groups.

FIGS. 2 and 2*a* show one embodiment of the invention wherein is there provided a diode with bias potential.

Figure 1:
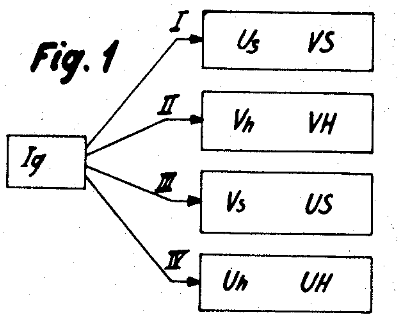

FIGURE 1 shows diagrammatically a known relay arrangement having synchronized relay groups. This arrangement consists of two relay groups U and V which operate alternatively. Control windings VS of the relays of group V are connected to control contacts U*s* of the relays of group U, and control windings US of the relays of group U are connected to control contacts V*s* of the relays of group V. The relays of groups U and V are also provided with holding windings UH and VH, which are connected to holding contacts U*h* and V*h*. With such known circuits the switch cycle is carried out by an impulse generator I*g*, which supplies a series of control and holding impulses through branches I to IV. The impulses are so displaced in time, that control impulses are alternatively transmitted over the branches I and III. A holding impulse is transmitted through the branch IV simultaneously with a control impulse through the branch I. The branches II and III are also simultaneously traversed with holding and control impulses. The impulses are located "with gaps," that is to say that one relay group must have terminated its switching movement before the next relay group is switched in. As a result generally the relays are never switched on under current.

After the ending of the switching the contact position is maintained by energising the windings VH to UH, so that engaged relay contacts become active during the next switching operation.

Figure 2:
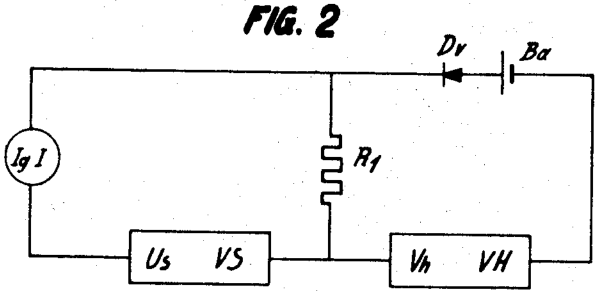
Figure 2A:
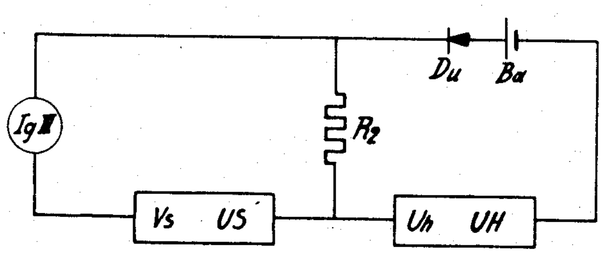

The embodiment shown in FIGURES 2 and 2*a* is an arrangement with two control circuits, one consisting of impulse generator I*g*I, relay contacts U*s* and relay winding VS and resistor R1, and the other consisting of impulse generator I*g*III, relay contacts V*s*, relay windings US and resistor $R_2$. The arrangement further contains two holding circuits each including resistor R, and resistor $R_2$, respectviely, holding windings VH and UH in series with holding contacts V*h* and U*h*, a diode D*v* and D*u* and a source of voltage B*a*.

According to FIGS 2 and 2*a*, the arrangement appears to be formed by two separate independent parts. It must, however, be pointed out that the contacts U*s* of the relays U belong to FIG. 2 and the windings US of the same relay to FIG. 2*a*. The windings VS of the relay V and the contacts *Vs* are indicated respectively in FIG. 2 and FIG. 2*a*. As the two parts of the circuit are completely symmetrical, the explanations regarding the method of operation are only indicated with reference to FIG. 2 of the arrangement of circuit.

The diode D*v* is so constructed that it allows the current of B*a* to flow as long as no control impulse is present. This holding current thus flows through the resistor R1, the holding windings VH and the holding contact V*h*. When a current impulse is supplied to the control circuit, a drop in voltage occurs in the resistor R1. This drop in voltage must be at least as large as the voltage of B*a*, in order to bring the diode D*v* into its locking range and to interrupt the holding current. When the control impulse has terminated, the voltage at R1 disappears and the holding current can flow from the voltage source B*a* into VH. In the absence of a control impulse, for example by reason of a poor contact of the switch S, no drop in voltage is produced in the resistor R1, so that the holding current in VH is not interrupted. The holding windings VH are, for example, provided on the relays with VS as main windings. As a result the switch position of the relays V before the omitted impulse is not lost.

Figure 3:
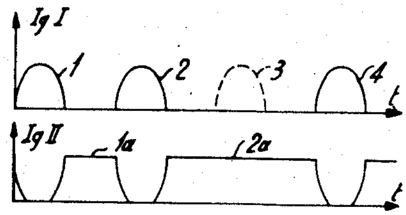
FIG. 3 is an impulse diagram.

FIG. 3 shows the diagram of the control and holding impulse of the circuit according to FIG. 2. The control impulses are indicated by 1, 2, 3 and 4, whereby the impulse 3, indicated in broken lines, for example in consequence of a faulty contact US does not produce a current in the windings V3 and in the resistor R1. After the termination of the control impulse 1 there begins a holding impulse 1*a*, which is interrupted by the drop in voltage in R1. After the control impulse 2 the holding impulse 2*a* continues until the beginning of the control impulse 4, as the control impulse 3 is missing.

Figure 4:
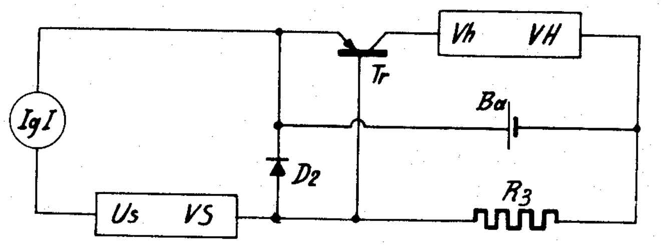
FIG. 4 shows an embodiment having a transistor circuit.

FIG. 4 shows a circuit similar to FIG. 2, in which the necessary electrical output for controlling the holding circuit is much lower. The holding circuit contains a transistor T*r*, a battery B*a*, holding windings VH and holding contacts V*h* a resistor R3 and a diode D2. In this circuit, the two terminals of the battery B*a* are connected together through the series connection of R3 and D2. This series connection, however, is not traversed by the current by reason of the non-conductance of the diode D2. In this condition the internal resistance of the diode D2 is very high and the emitter of the transistor T*r* is fed with current. The collector stream therefore flows uninterruptedly through the holding windings VH until a control impulse is produced in the control circuit. The direction of the control current is to be selected in such a manner that it corresponds with the conducting direction of the diode, so that the control impulses can flow over the diode D2. The voltage drop in the diode D2 is very low so that the potential of the emitter is about equal to that of the base of the transistor. The transistor Tr thus locks the holding current. It will be understood that the diode D2 could be replaced by a resistor, but such a modification would produce an additional current flow of the battery Ba through R3 and this additional resistor. The use of a diode is thus more advantageous, as it gives, in the case of control impulses of Ig with flat flanks, sufficient control voltage on the transistor at the beginning of the impulse, but at higher flows in R2, it limits the control voltage of the transistor by reason of its non-linear characteristic.

Figure 5:
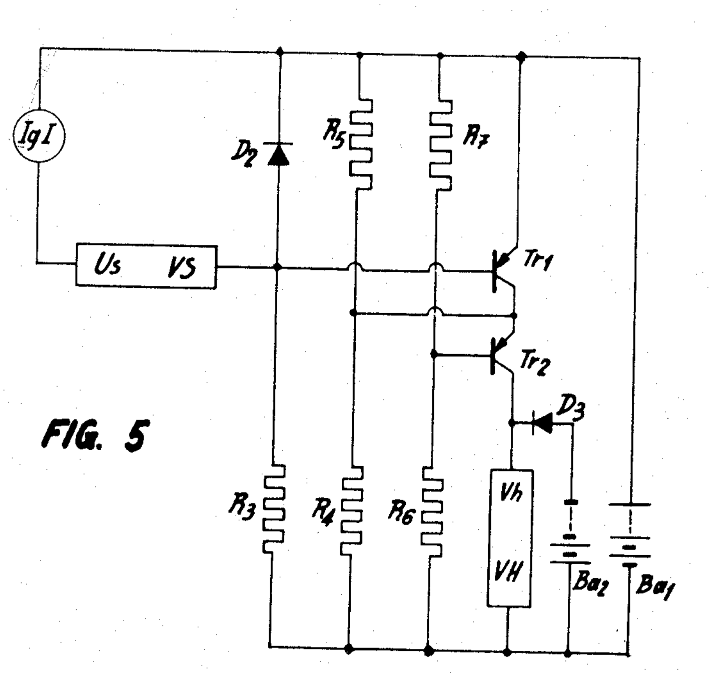
FIG. 5 shows an embodiment having two transistors with the object of being able to switch in a higher voltage.

In FIG. 5 is shown a further development of the circuit shown in FIG. 4.

Frequently it is desirable to allow relay groups to operate at higher voltages than they could be switched in with a single transistor. In this connection it is necessary to consider that it is not only necessary to switch in the voltage source, but also the voltage apices, which occur when switching off the relays. The elements IgI, US, Vs, and R3 and Tr1 have the same functions as the corresponding ones in FIG. 4. With base operated transistor Tr1 are switched in series one or more base operated transistors Tr2. The voltage divider R6, R7 forms a voltage source having an inner resistance and is for the purpose of maintaining the basis of Tr2 in the locked position at a predetermined potential, while in the conducting position it limits the base current of the transistor Tr2. The voltage divider R4, R5 serves the purpose of maintaining the emitter in the locked condition at prescribed potential, which enables the residual current of the blocked transistor Tr2 to be reduced. The voltage peaks produced by the breaking action of the relays is limited to a considerable content by reason of the diode D3 biased by the battery Ba2.

We claim:

1. An electrical circuit comprising, in combination, at least two groups of relays actuated by current impulses, an impulse generator for feeding each of said relay groups with control impulses, a holding circuit means for holding a relay armature actuated by a control impulse in each of said relay groups, contacts in one of said relay groups, which contacts are switched in series with windings of the other relay group, means for feeding each holding circuit with direct current, electronic switch means actuated by control impulse current passing through at least one relay winding of one group of relays and a contact of another group of relays for controlling the flow of direct current in each holding current, said holding current being interrupted during the duration of each control impulse.

2. The electrical circuit of claim 1 wherein said electronic switch means includes a diode, said diode being in said holding circuit, and a resistor through which said control impulse passes, whereby the voltage produced by current passing through said resistor causes said diode to be non-conducting thereby cutting off said holding current.

3. The electrical circuit of claim 1 wherein said electronic switch means includes a transistor switched into said holding circuit and a resistor through which said control impulse passes, whereby the voltage produced by the current through said resistor acts on said resistor to stop the passage of said holding current.

4. The electrical circuit of claim 3 wherein said resistor is a diode.

5. The electrical circuit of claim 3 wherein said transistor is a grounded emitter and is in series with a basis operated transistor, said circuit including a voltage source means having an inner resistance for maintaining the basis of said grounded basis transistor in non-conducting condition at a predetermined potential and for limiting the basic current of said grounded basis transistor in conducting position, whereby the residual current of said non-conducting grounded basis transistor is reduced.

References Cited by the Examiner

UNITED STATES PATENTS

| | | | |
|---|---|---|---|
| 2,461,060 | 2/49 | Johnson et al. | 317—150 |
| 2,775,726 | 12/56 | Kroes et al. | 317—140 |
| 3,004,703 | 10/61 | Hoppe | 235—159 |
| 3,004,704 | 10/61 | Hoppe | 235—159 |

OTHER REFERENCES

Keister et al.: The Design of Switching Circuits, copyright 1951 by D. Van Nostrand Company, Inc., pages 239–242.

SAMUEL BERNSTEIN, *Primary Examiner.*